3,444,827
DOUGH FORMING DEVICE
Willy Chapuis and Willy Kuhner, Burgdorf, Switzerland, assignors to Gustave A. Seewar, Burgdorf, Bern, Switzerland
Filed May 5, 1967, Ser. No. 636,299
Claims priority, application Switzerland, May 6, 1966, 6,585/66
Int. Cl. A21c 3/00
U.S. Cl. 107—9      4 Claims

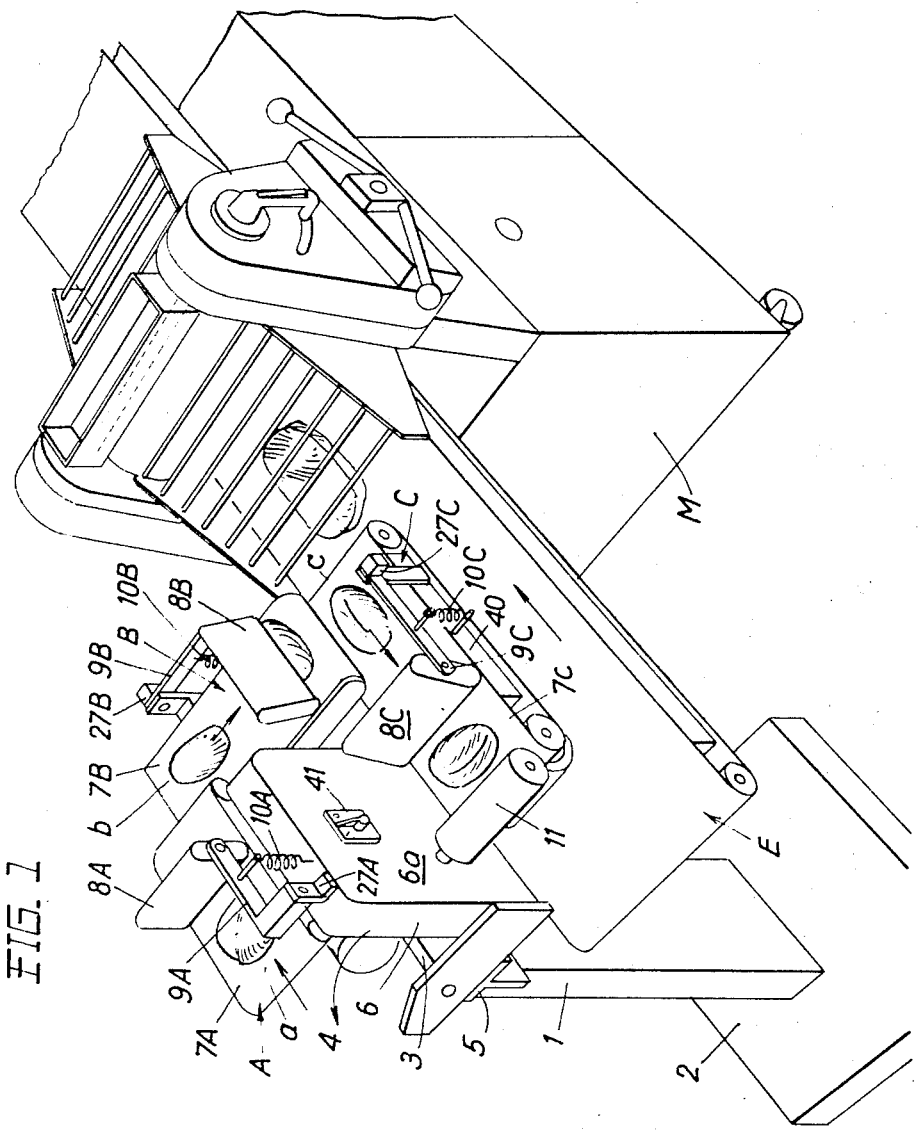

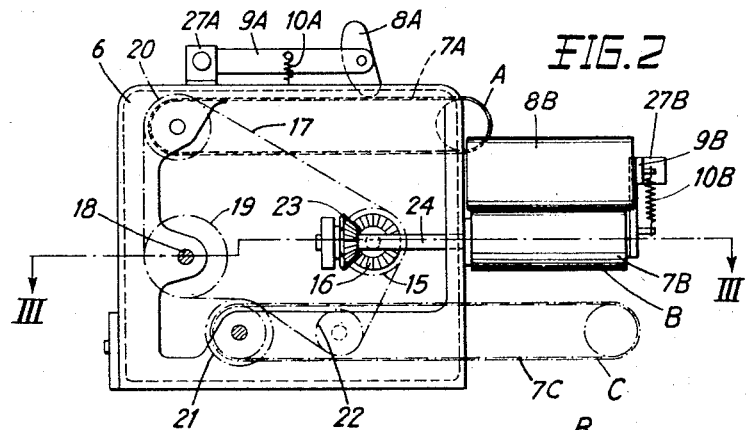
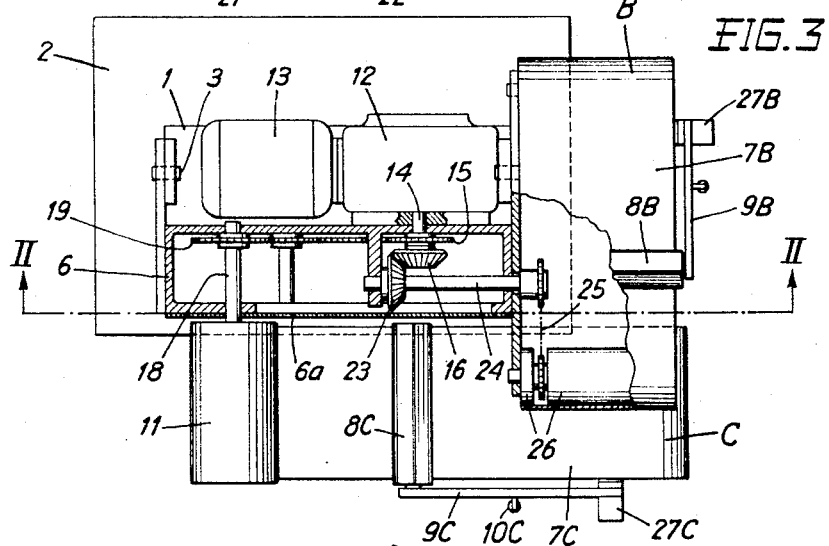
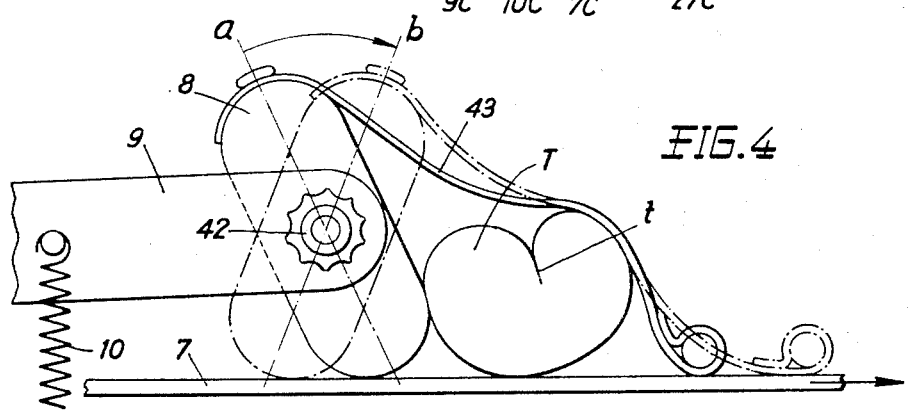

ABSTRACT OF THE DISCLOSURE

A dough forming device in which each unit of a series of forming units comprising a conveyor with an endless belt and a forming plate extending transversely over same from a supporting arm loaded by a spring. In each unit the piece of dough is at first slightly upset when it encounters the forming plate, then lifts same and, as it passes beneath same, is slightly rolled in.

Background of the invention

The present invention relates to a dough forming device. Pieces of dough which are torn or cut from a supply of dough to be weighed must in many cases, for example before they are worked to round breads or to long breads, be formed to obtain a shape approximating that of a ball or of a roll and at the same time their surface should be smoothened by being spanned towards one single spot. Experienced bakers carry out this work with their hands which perform combined kneading and smoothing motions. These manual operations are however very time-consuming and laborious.

Although various physical constructions of mechanical dough formers are known to the art, such as are disclosed in Swiss Patent No. 286,092 and German Patent No. 614,249, these dough formers are quite complex and expensive and generally fail to knead the dough with the required intensity and do not impart to the dough either the shape or smoothness contemplated in the present invention.

It is one object of the present invention to propose a device which is relatively cheap and which nevertheless performs the forming work mentioned hereabove in a satisfactory manner. Moreover this device should be compact so that it is well possible to arrange it with its delivery end portion over the intake feeder of a dough rolling machine.

Other objects, advantages and salient features of the present invention will become apparent from the following detailed description, which, taken in conjunction with the annexed drawing, discloses a preferred embodiment thereof.

Brief description of the drawing

FIG. 1 is a perspective view of a device according to the invention, arranged in the vicinity of the intake feeder of a dough rolling machine or dough moulding machine, FIG. 2 is a partial section view taken along the line II—II of FIG. 3, FIG. 3 is a partial section view along the line III—III of FIG. 2, and FIG. 4 is an elevational view of a detail of the device at an enlarged scale.

Description of the preferred embodiments

The device represented on the drawing comprises a stand 1 having a base or foot 2. A casing 6 mounting a driving motor and gearings (as set out more fully hereinafter) is mounted on the upper part 5 of the stand 1 to be swingable about an axle or shaft 3 in the direction of the arrow 4; in its position of use the casing 6 takes the position shown in FIG. 1.

On its front side, the casing 6 is closed by a cover 6a. On each of three sides of the casing 6 and cover unit 6a there is arranged a forming unit; these units are designated with the reference characters A, B and C, respectively. Each of these forming units includes as main parts a conveyor-belt 7A, 7B, 7C, respectively, and a forming plate 8A, 8B, 8C, respectively, which extends transversely over the corresponding conveyor-belt and is secured at one of its ends to an arm 9A, 9B, 9C, respectively. Each such arm is pivotally mounted to a fixed part and loaded by a spring 10A, 10B, 10C, respectively, or by a similar means, towards the corresponding conveyor-belt. The conveyor-belts 7A, 7B, 7C are echeloned in vertical direction so that they are, to say arranged in the fashion of a winding stair behind one another around the casing 6, 6a.

Each of the conveyor-belts is a part of a conveyor of conventional construction including a frame 40, as shown in FIG. 1 for the conveyor-belt 7C. These frames are secured to the casing 6, 6a in a manner not shown on the drawing; each of them also carries the bearing means for the rollers around which the corresponding conveyor-belt moves. One of these two rollers in each conveyor is positively driven.

In the embodiment represented on the drawing, the driving mechanism for the positively driven rollers of the three conveyor-belts and also for a squeezing roller 11 arranged at the out-take or delivery side of the third forming unit C is constructed as follows. At the back side of the casing 6, the casing of a worm gearing 12 is secured by means of screws; it supports the casing 13 of an electrical driving motor which may be switched in and out by means of a switch 41, the handle of which is arranged in front of the cover plate 6a. A chain gear 15 and a bevel gear 16 are secured beside one another inside the casing 6 on the output shaft 14 of the worm gearing 12. A chain 17 drivingly connects the chain gear 15 with a chain gear 19 secured to a shaft 18 to which is also secured the squeezing roller 11. The same chain 17 also drivingly connects the chain gear 15 with a chain gear 20 and with a chain gear 21. Moreover, the chain 17 runs over a chain spanning roller 22. The chain gear 20 is secured to a shaft (not shown) to which is also secured a driving roller of the conveyor-belt 7A. Gear 21 is secured to another shaft to which is also secured a driving roller of the conveyor-belt 7C.

A bevel gear 16 meshes with a bevel gear 23 which drives the driving roller 26 of the conveyor-belt 7B by means of a shaft 24 and chain gearing 25. The roller 26 is divided into a short and a long portion as shown in FIG. 3, purely for constructional reasons. An arm 9A is pivotally supported by a bearing 27A secured to the upper side of the casing 6 whereas arms 9B and 9C are respectively mounted on bearings 27B and 27C, each of which is fixed to the frame 40 of the corresponding conveyor.

As shown in FIG. 4, the forming plate 8 of each one of the forming units is supported on an axle to be rockable about an axis which coincides with its longitudinal main axis which extends transversely to the direction of motion of the supporting surface of the conveyor, within the limits indicated by the lines $a$ and $b$ with regard to the corresponding arm 9. The plate 8 may be fixed in any position within this pivotal range by means of a clamping screw or nut 42. Differing pivotal settings in the range $a$ to $b$ are chosen in accordance with the hardness of the dough and serve to also influence the measure of the forming work performed on the piece of dough. The inclination with regard to a perpendicular, transverse plane to the supporting surface of the conveyor-belt 7 is at most 15°.

A strip of heavy cloth or the like, denoted with the reference numeral 43 in FIG. 4, may be fastened at one of its ends on the upper side of the forming plate 8. The task of forming cloth 43 consists in giving to the just formed piece of dough T the desired position by rotating same about its longitudinal axis so that its "intern slit" *t* comes to lie directly downward on the conveyor-belt 7 of the next following forming unit. This effect is obtained because, depending on the pivotal setting of the forming plate 8, the piece of dough just formed must travel a longer or shorter way beneath forming cloth 43.

The forming plate might have, in transversal section, many suitable shapes differing from that shown in FIGS. 1 and 4.

In FIG. 1 of the drawing, a dough rolling machine and/or forming machine of known construction is denoted by the reference M and its intake or infeed conveyor is denoted by E. The just described preforming device is so arranged that the third unit C thereof is placed over the intake conveyor E.

In use of the preforming device, a piece of dough which has preferably been slightly rolled so as to be flat is carried along in the direction of the arrow on the conveyor-belt 7A of the unit A. When it encounters the forming plate 8A, this piece of dough is at first upset by a small amount whereafter it lifts the forming plate 8A together with its supporting arm 9A against the resistance of the spring 10A. When the piece of dough passes beneath forming plate 8A so lifted, the upset piece of dough has the tendency to roll itself inwardly by a small amount and, at the same time it is somewhat spread out in its longitudinal direction and cross sectionally assumes a slightly upset kidney shape as shown. The so-worked piece of dough then arrives at *b* on the conveyor-belt 7B of the unit B. As soon as it arrives in the range of the forming plate 8B over conveyor B, it undergoes a forming operation as previously described with reference to the forming plate 8A. Thereafter the piece of dough which has now been formed twice is then delivered to and arrives at C on the conveyor-belt 7C of the unit to undergo a third forming operation in the range of the forming plate 8C. The preforming of the piece of dough as described is then finished and the piece of dough is eventually squeezed flat between the conveyor-belt 7C and the squeezin groller 11 and falls onto the intake conveyor E of the standard rolling and/or forming machine M.

If the preforming device of the invention is not needed, it may be swung upwards as a whole about the axle 3 with regard to the stand 5. Preferably, the base or foot 2 of the stand 1 is equipped with cluster rolls, so that the whole preforming device together with its stand may be moved away from the standard rolling and/or forming machine M.

What is claimed is:
1. A device for forming pieces of dough comprising: a conveyor having an endless conveyor-belt; a forming member means extending over said conveyor-belt transversely thereto, said forming member means comprising a forming plate, said forming plate having a lower edge surface adjacent the supporting surface of said conveyor-belt which is substantially rounded in cross-section, said forming plate being inclined with respect to a perpendicular, transverse plane to the supporting surface of said conveyor-belt by an angle of at most 15°; arm means for supporting said forming plate, said arm means extending approximately parallelly to the supporting surface of said conveyor-belt and being pivotally mounted to a fixed part of said device, said arm means further being loaded by means for pressing said forming plate with its lower edge surface which is rounded in cross section onto the supporting surface of said conveyor-belt; whereby a piece of dough lying with friction on the supporting surface of said conveyor-belt is at first upset until it lifts said forming plate against the loading of said means loading said arm means, where the upset piece of dough undergoes, under the lifted forming plate, a forming or kneading process by which it obtains a shape cross sectionally approximating that of a slightly upset kidney.

2. A device as defined in claim 1, wherein a plurality of said conveyors, and associated forming plates are arranged behind one another in the fashion of a winding stair.

3. A device as defined in claim 1, wherein said forming plate is supported by said arm means and mounted so as to be settable by a pivotal movement about its longitudinal main axis.

4. A device as defined in claim 1, wherein a forming cloth is attached at one end thereof to an upper edge of said forming plate.

References Cited
UNITED STATES PATENTS

| | | |
|---|---|---|
| 1,805,018 | 5/1931 | Scruggs. |
| 1,949,105 | 2/1934 | Lauterbur et al. |
| 2,677,334 | 5/1954 | Hansen. |
| 2,907,286 | 10/1959 | Ruiz ---------------- 107—12 |

FOREIGN PATENTS

| | | |
|---|---|---|
| 277,432 | 9/1930 | Italy. |
| 491,582 | 12/1936 | Great Britain. |
| 830,007 | 5/1938 | France. |
| 856,731 | 11/1952 | Germany. |

WALTER A. SCHEEL, *Primary Examiner.*

ARTHUR O. HENDERSON, *Assistant Examiner.*